(12) United States Patent
Iitsuka et al.

(10) Patent No.: US 6,463,151 B1
(45) Date of Patent: Oct. 8, 2002

(54) DATA TRANSMISSION METHOD, DATA RECEIVING METHOD, DATA TRANSMISSION SYSTEM AND PROGRAM RECORDING MEDIUM

(75) Inventors: Hiroyuki Iitsuka, Katano (JP); Masazumi Yamada, Moriguchi (JP); Hideaki Takechi, Osaka (JP); Natsume Matsuzaki, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/182,568

(22) Filed: Oct. 29, 1998

(30) Foreign Application Priority Data

Oct. 29, 1997 (JP) ............................................. 9-297614

(51) Int. Cl.$^7$ ................................................. H04L 9/00
(52) U.S. Cl. .......................................... 380/201; 705/57
(58) Field of Search ................................. 380/201, 203, 380/255, 239; 705/51, 52, 57; 713/168, 194, 160

(56) References Cited

U.S. PATENT DOCUMENTS 5,974,140 A * 10/1999 Tanaka .......................... 705/52
5,987,126 A * 11/1999 Okuyama et al. ............ 380/203
6,185,687 B1 * 2/2001 Sako et al. .................. 713/200

OTHER PUBLICATIONS

"IEEE Standard For A High Performance Serial Bus", The Institute of Electical and Electronics Engineers, Inc. pp. 19–47, 142–163, 210–217, copyright 1996.

"IEC 61883–1: Consumer Audio/Video Equipment—Digital Interface–Part 1: General", International Electronical Commission, Circulated Sep. 26, 1997, 100C/182/FDIS.

"IEC 61883–2: Consumer Audio/Video Equipment—Digital Interface—Part 2: SD–DVCR Data Transmission", International Electronical Commission, Circulated Sep. 26, 1997, 100C/183/FDIS.

"IEC 61883–3: Consumer Audio/Video Equipment—Digital Interface—Part 3: HD–DVCR Data Transmission", International Electronical Commission, Circulated Sep. 26, 1997, 100C/184/FDIS.

"IEC 61883–4: Consumer Audio/Video Equipment—Digital Interface—Part 4: MPEG2–TS Data Transmission", International Electronical Commission, Circulated Sep. 26, 1997, 100C/185/FDIS.

"IEC 61883–5: Consumer Audio/Video Equipment—Digital Interface—Part 5: SDL–DVCR Data Transmission", International Electronical Commission, Circulated Sep. 26, 1997, 100C/186/FDIS.

* cited by examiner

Primary Examiner—Matthew Smithers
(74) Attorney, Agent, or Firm—Ratner & Prestia

(57) ABSTRACT

The data transmission system can substantially prohibit illegal copy of real data since the encryption key applied to transmitted data is changed depending on copy management information, thereby the real data being decrypted and recorded with a key different from the original key when the copy management information is tampered. Thus, the transmitted data can be further securely protected than in the prior art.

41 Claims, 6 Drawing Sheets

DATA TRANSMISSION METHOD, DATA RECEIVING METHOD, DATA TRANSMISSION SYSTEM AND PROGRAM RECORDING MEDIUM

BACKGROUND OF THE INVENTION

1. Field of the Invention

The present invention relates to a data transmission method, a data receiving method, a data transmission system, and a program recording medium used for transmitting and receiving, for example, digital data.

2. Description of the Related Art

Conventional data transfer method includes one employing IEEE 1394 Standard (IEEE: The Institute of Electrical and Electronic Engineers, Inc.) (reference: IEEE 1394 High Performance Serial Bus). Data transfer in IEEE 1394 Standard includes isochronous communication suitable for transfer of isochronous data such as video or sound signals, and asynchronous communication suitable for transfer of asynchronous data such as control signals, and both communications can simultaneously exist on an IEEE 1394 bus.

The isochronous communication is so-called broadcasting type communication. Isochronous packets output from a device on the IEEE 1394 bus can be received by all other devices on the bus.

On the other hand, the asynchronous communication includes peer-to-peer communication and a broadcasting type communication. Then, an asynchronous packet output from a device on the bus contains an identifier identifying a device receiving that packet. If the identifier indicates a specific device, the device specified by the identifier receives the asynchronous packet, and, if the identifier indicates broadcast, all devices on the bus receive the asynchronous packet.

In addition, IEC (International Electrotechnical Commission) is studying IEC 61883 Standard (hereinafter called an "AV protocol") as a standard for transferring a digital audio or video signal employing IEEE 1394 Standard, or managing connections of a data transmission path between equipment attached on the IEEE 1394 bus. In the AV protocol, video/audio data is arranged and transmitted in an isochronous packet. In addition, an isochronous packet contains a CIP (Common Isochronous Packet) header. The CIP header contains identification information indicating a type of video/audio data, and information such as a device number of source device transmitting an isochronous packet.

For a data transmission system employing such conventional data transfer method, a data transmission system is proposed to limit the number of copies of data to be transferred with data protection information in view of protection of copyright of data to be transmitted. Digital data requiring such copy limiting mechanism includes video data which is digitized video images, audio data which is digitized sound, and digital data which is a combination of them.

Now, such conventional data transmission system is described for its arrangement with reference to FIG. 6.

FIG. 6 is a format of isochronous packet used in the conventional data transmission system.

As shown in the figure, the isochronous packet 101 comprises an isochronous packet header 900, a header CRC 901, an isochronous payload 902, and data CRC 903.

The isochronous packet header 900 contains an Sy field 910 for storing data protection information. If the value stored in the most significant two bits of the Sy field 910 is 00, it indicates that data to be transmitted (real data 905 described later) is data freely copied. If it is 10, it indicates that the data can be copied only once, while, if it is 11, it indicates that the data is copy prohibited.

In addition, the isochronous packet header 900 contains a two-bit tag 907. If the tag 907 has a value of 01, it indicates that the isochronous packet is an isochronous packet conforming to the AV protocol. When the tag 907 has a value of 01, that is, when the isochronous packet is an isochronous packet conforming to the AV protocol, a CIP header 904 is contained at the top of an isochronous payload 902.

The CIP header 904 contains a source ID 906 which is an identifier of the device outputting the isochronous packet. The CIP header 904 also contains FMT 908 or FDF 909. indicating what type data the real data 905 contained in the isochronous payload 902 is.

Data such as video or audio to be transmitted is contained in the real data 905. The real data 905 is encrypted data if the data protection information is 10 or 11, and not encrypted if it is 00 indicating copy-freely. The data protection information is also contained in the real data 905, and generally called SCMS for CD and CGMS for DV.

Now, operation is described for such arrangement.

When a source device transmits digital data, it embeds data protection information indicating a condition whether or not the data can be copied in the Sy field 910 in the isochronous packet header 900, and transmits the information together with the real data 905. A sink device retrieves the data protection information from the Sy field 910 in the received data, and changes over the operation of equipment in recording the digital data based on the result of interpretation on the data protection information. In addition, except for a case where it is copy-freely data, since the real data is encrypted, the sink device sends a transfer request for decryption information necessary for decrypting it to the source device. Upon receipt of the request, the source device sends decryption information to the requesting device. The sink device decrypts the received real data 905 using the decryption information sent from the source device. The real data 905 thus decrypted is displayed on a display device. On the other hand, an operation for recording the decrypted real data is appropriately changed over based on content of the data protection information.

That is, when the sink device is, for example, a VTR, and the retrieved data protection information means "copy-one-generation", the decrypted data is recorded on video tape loaded in the VTR. If it means "copy-prohibited", the recording operation is not performed even if a recording button has been pressed.

However, in such conventional data transmission system, there is a problem that, if the data protection information contained in the Sy field 910 is tampered on a transmission path between the source device and the sink device by a person intending to conduct an unauthorized action, the decrypted data is unauthorizedly copied.

That is, for example, it is assumed that, when the data protection information contained in the Sy field 910 of the isochronous packet header 900 has a value of 11 indicating "copy-prohibited" in the stage when the data is transmitted from the source device, a person conducting an illegal action tampers the value of data protection information to 10 indicating "copy-one-generation" on the transmission path. This case is described in detail in the following.

In this case, the VTR at the sink device checks the data protection information contained in the Sy field 910, and detects that its value is 10. In this case, since the real data 905 is encrypted as described above, the sink device sends a transmission request for decryption information for decrypting it to the source device. Upon receipt of the request, the source device sends the decryption information to the sink device. The sink device decrypts the real data 905 using the decryption information being sent, and then displays the decrypted real data on the display device or the like. Then, there arises a problem that, since the VTR has detected the fact that the data protection information contained in the Sy field 910 has a value of 10, it determines that the received real data 905 is copy-one-generation although it is originally copy-prohibited data, and records the decrypted real data on the video tape.

SUMMARY OF THE INVENTION

The present invention is intended to provide a data transmission method, a data receiving method, a data transmission system, and a program recording medium in which transmission data can be more surely protected than in the prior art by taking into account such problems in the conventional data transmission system.

The 1st aspect of the present invention is a data transmission method comprising the steps of:
determining a type of encryption applied to transmission of data depending on management information for said data to be transmitted;
encrypting said data based on said determined type of encryption; and
transmitting said encrypted data and said data management information.

The 2nd invention of the present invention is a data receiving method comprising the steps of:
receiving transmission data transmitted from the data transmission method as set forth in said 1st invention;
retrieving said data management information from said received data; and
sending said retrieved data management information to the source of said transmitted data and requesting decryption information corresponding to said transmitted data management information.

The 3rd aspect of the present invention is the data transmission method as set forth in said 1st invention, further comprising the step of, when said decryption information is requested by the data receiving method as set forth in said 2nd aspect, transmitting said decryption information corresponding to said data management information to said requesting device.

The 4th aspect of the present invention is the data receiving method, further comprising the steps of:
decrypting said received data based on said decryption information transmitted by the data transmission method as set forth in said 3rd invention; and
determining how to process said decrypted received data according to said retrieved data management information.

The 5th aspect of the present invention is a data transmission method, further comprising the steps of:
updating said type of encryption by time even if said data management information is identical;
encrypting said data to be transmitted with said updated type of encryption; and
transmitting previous notification information previously notifying that said update is performed before transmitting said encrypted data.

The 6$^{th}$ of the present invention is a data transmission method, further comprising the steps of:

updating said type of encryption by time even if said data management information is identical;
transmitting information indicating that said update has been performed; and
when decryption information corresponding to said data management information is requested, transmitting both decryption information to be used at the moment and decryption information to be used the next time.

The 7th aspect of the present invention is a data transmission method wherein, when said type of encryption is updated by time, said updated type of encryption does not overlap said another type of encryption determined according to said data management information.

The 8th aspect of the present invention is a data receiving method, further comprising the steps of, when said previous notification information transmitted by said data transmission method as set forth in said 5th invention is received, sending said data management information to the source of said transmitted data according to the previous notification information, and requesting said decryption information.

The 9th aspect of the present invention is a data receiving method further comprising the step of, when information transmitted by said data transmission method as set forth in said 6th invention indicating that said update has been performed is received, requesting said decryption information for the source of said information based on the received information.

The 10th aspect of the present invention is a data receiving method wherein sending said data management information is to send said retrieved data management information as is, or to send said retrieved data management information after predetermined conversion.

The 11th aspect of the present invention is a data transmission method, wherein determining the type of. encryption applied to transmission of said data according to said data management information is to make a key used for encryption different depending on said data management information.

The 12th aspect of the present invention is a data transmission method, wherein determining the type of encryption applied to transmission of said data according to said data management information is to make an algorithm used for encryption different depending on said data management information.

The 13th aspect is the present invention is a data transmission method, wherein said data management information is copy management information which includes information indicating that said data is copy-freely, copy-one-generation, or copy-prohibited.

The 14th aspect of the present invention is a data transmission method wherein
said information indicating copy-prohibited includes two types of information, one indicating that the data is originally copy-prohibited, the other indicating no-more-copies meaning that the data is prohibited for subsequent copy as it is originally copy-one-generation and the one generation is performed, and
said type of encryption differs depending on these two types of information.

The 15th aspect of the present invention is a data receiving method, further comprising the step of:
when the data management information sent by the data transmission method as set forth in said 13th invention indicates copy-one-generation,
in recording data with said information indicating copy-one-generation as the data management information in a predetermined recording medium, changing the content of said data management information from said copy-one-generation to copy-prohibited, and performing said recording together with the data management information indicating said copy-prohibited.

The 16th aspect of the present invention is a data receiving method, further comprising the step of:

when the data management information sent by the data transmission method as set forth in said 14th invention indicates copy-one-generation, in recording data with said information indicating copy-one-generation as the data management information in a predetermined recording medium, changing the content of said data management information from said copy-one-generation to said no-more-copies, and performing said recording together with the data management information indicating said no-more-copies.

The 17th aspect of the present invention is a data transmission system comprising;

mode determination means for determining a type of encryption applied to transmission of data depending on management information for said data to be transmitted;

encryption means for encrypting said data based on said determined type of encryption;

data transmission means for transmitting said encrypted data and said data management information;

data receiving means for receiving the transmission data transmitted by said data transmission means;

data management information retrieving means for retrieving said data management information from said received data;

decryption information requesting means for sending said retrieved data management information to the source of said transmitted data and requesting decryption information corresponding to said transmitted data management information;

decryption information transmitting means for transmitting said decryption information corresponding to said data management information to said requesting device when said decryption information is requested;

decryption means for decrypting said received data based on said decryption information being sent; and processing method determination means for determining how to process said decrypted received data according to said retrieved data management information.

The 18th aspect of the present invention is a data transmission system, wherein sending said data management information is to send said retrieved data management information as is, or to send said retrieved data management information after predetermined conversion.

The 19th aspect of the present invention is a data transmission system, wherein determining the type of encryption applied to transmission of said data according to said data management information is to make a key used for encryption different depending on said data management information.

The 20th aspect of the present invention is a data transmission system, wherein determining the type of encryption applied to transmission of said data according to said data management information is to make an algorithm used for encryption different depending on said data management information.

The 21st aspect of the present invention is a data transmission system, further comprising:

encryption type updating means for updating said type of encryption by time even if said data management information is identical; and previous notification information generation means for generating previous notification information for previously notifying that said update is performed, wherein when said encryption means encrypts data to be transmitted, said encryption means encrypts it according to said updated type of encryption, and said generated previous notification information is transmitted before said data encrypted according to said updated type of encryption is transmitted.

The 22nd aspect of the present invention is a data transmission system, further comprising:

encryption type updating means for updating said type of encryption by time even if said data management information is identical; and update execution information generation means for generating update information for notifying that said update has been performed, wherein when said encryption means encrypts data to be transmitted, said encryption means encrypts it according to said updated type of encryption, and said update information is transmitted when the data encrypted according to said updated type of encryption is started to be transmitted.

The 23rd aspect of the present invention is a data transmission system, wherein said decryption information requesting means requests said decryption information to said source of said transmitted data in response to said received previous notification information.

The 24th aspect of the present invention is a data transmission system wherein said decryption information requesting means requests said decryption information for said source of said transmitted data in response to change of said received update information.

The 25th aspect of the present invention is a data transmission system, wherein, when said type of encryption is updated by time, said updated type of encryption does not overlap said another type of encryption determined according to said data management information.

The 26th aspect of the present invention is a data transmission system, wherein said data management information is copy management information which includes information indicating that said data is copy-freely, copy-one-generation, or copy-prohibited.

The 27th aspect of the present invention is a data transmission system, wherein said information indicating copy-prohibited includes two types of information, one indicating that the data is originally copy-prohibited, the other indicating no-more-copies meaning that the data is prohibited for subsequent copy as it is originally copy-one-generation and the one generation is performed, and said type of encryption depends on these two types of information.

The 28th aspect of a data transmission system, further comprising the step of:

when the data management information sent by said data transmission means indicates copy-one-generation, in recording data with said information indicating copy-one-generation as the data management information in a predetermined recording medium, changing the content of said data management information from said copy-one-generation to copy-prohibited, and performing said recording together with the data management information indicating copy-prohibited.

The 29th invention of the present invention is a data transmission system, further comprising the step of:

when the data management information sent by said data transmission means indicates copy-one-generation, in recording data with said information indicating copy-one-generation as the data management information in a predetermined recording medium, changing the content of said data management information from said copy-one-generation to to no-more-copies, and performing said recording together with the data management information indicating no-more-copies.

The 30th aspect of the present invention is a program recording medium recording a program for causing a computer to execute all or parts of steps as set forth above.

The 31st aspect of the present invention is a program recording medium recording a program for causing a computer to execute all or parts of functions of each means as set forth above.

With the above arrangement, the present invention has an advantage that transmission data can be more surely protected than in the prior art.

DESCRIPTION OF THE REFERENCE NUMERALS

Figure 1:
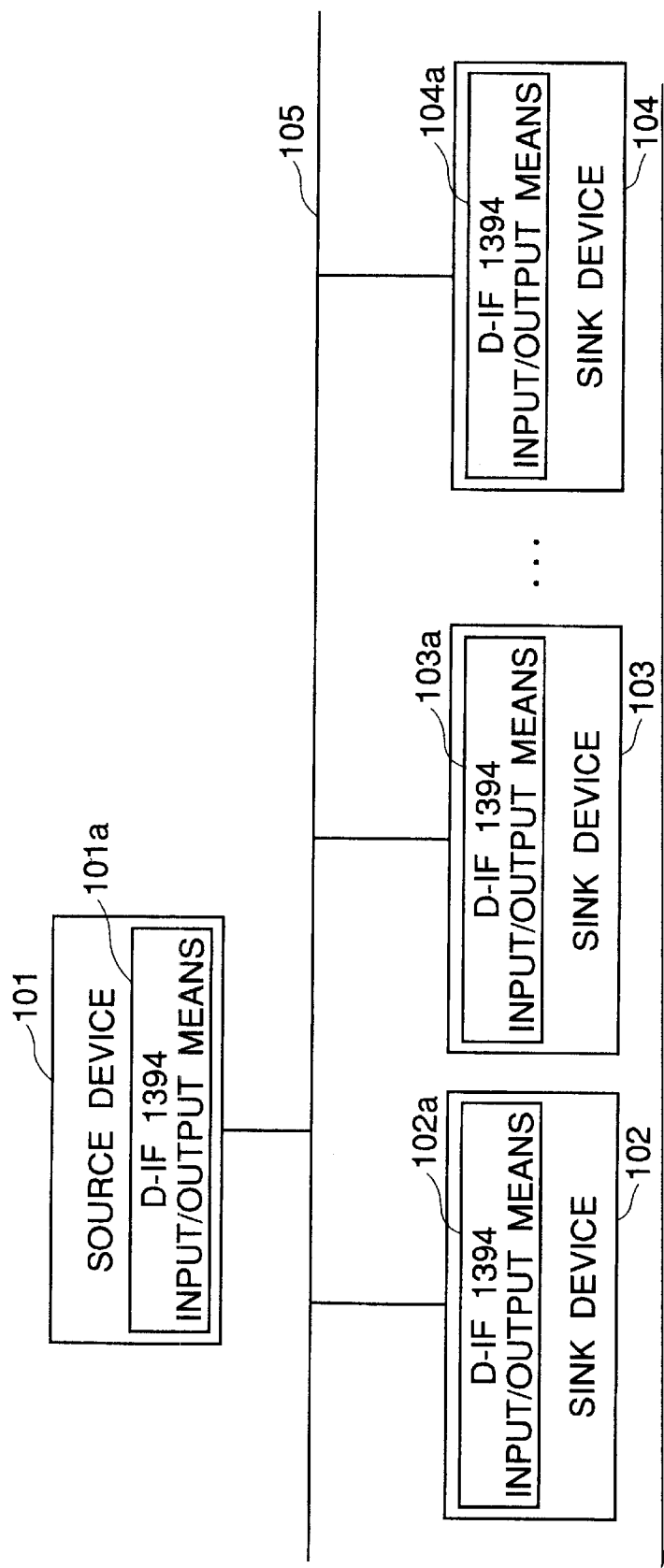
FIG. 1 is a schematic diagram of a digital transmission system according to an embodiment of the present invention.

101 Source device
101a D-IF 1394 input/output means (Data transmission means)
102a D-IF 1394 input/output means (Data receiving means)
102, 103, 104 Sink device
105 IEEE 1394 bus
201 Data output means
201a Data
202 Mode determination means
203 Key generation means (Encryption type updating means)
203a Key (asynchronous)
204 Key saving means
205 Encryption means
205a Data
206 Key distribution means (Decryption information transmitting means)
206b Completion of distribution
207 Change-over timing determination means (Encryption type updating means)
207a Change-over information
208 Change information generation means (Previous notification information generation means)
209 Packet generation means
209a Data packet (isochronous)
301 Packet decoding means (Data management information retrieving means)
302 Key acquisition means (Decryption information requesting means)
303 Mode detection means
304 Decryption means
305 Data recording/reproduction means (Processing method determination means)
306 Key saving means
307 Display means
308 Audio output means
310 Change information

DESCRIPTION OF THE PREFERRED EMBODIMENTS

Now, an embodiment of the data transmission system according to the invention is described while referring to the drawings.

Figure 2:
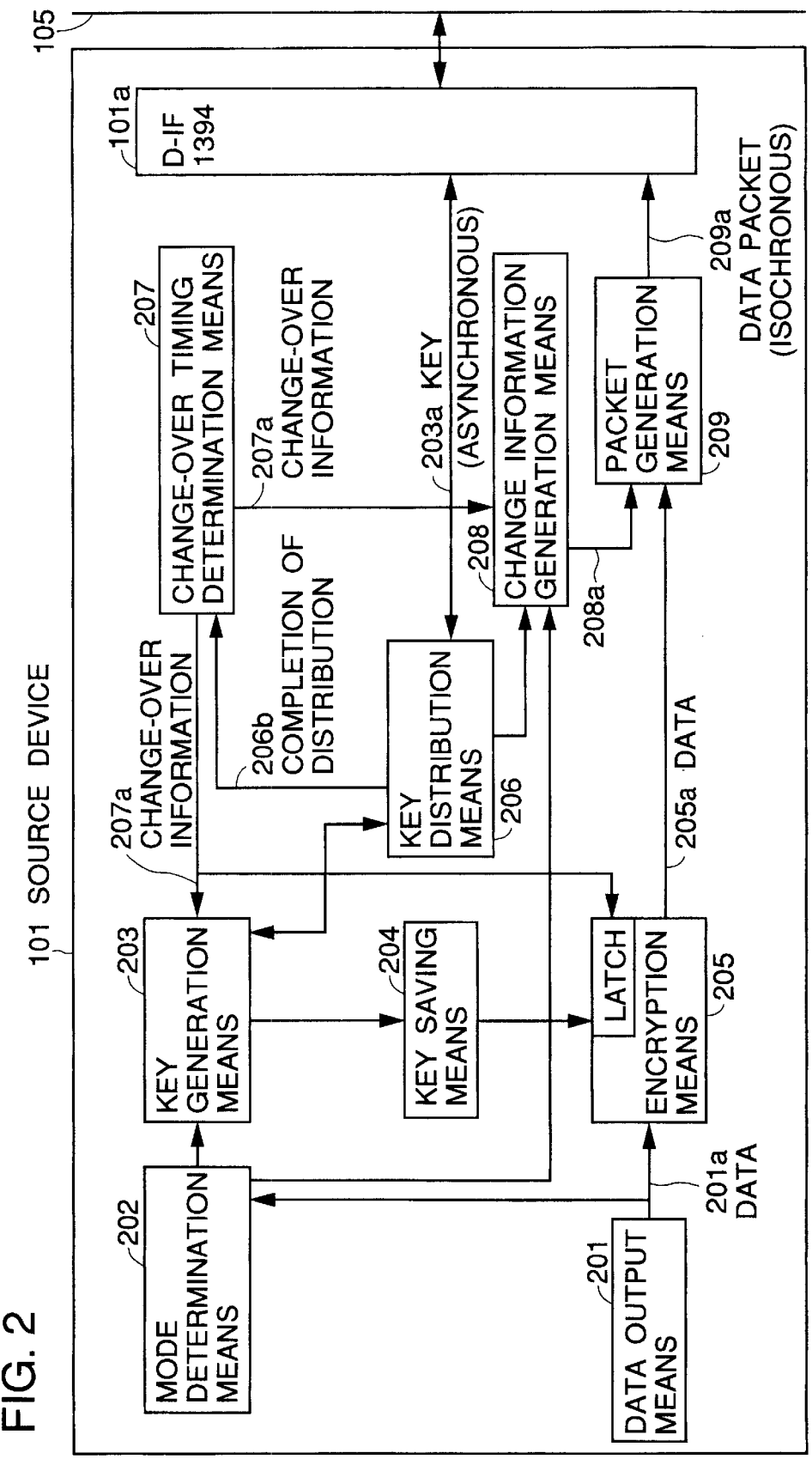
FIG. 2 is a block diagram showing an arrangement of a source device according to the embodiment.
Figure 3:
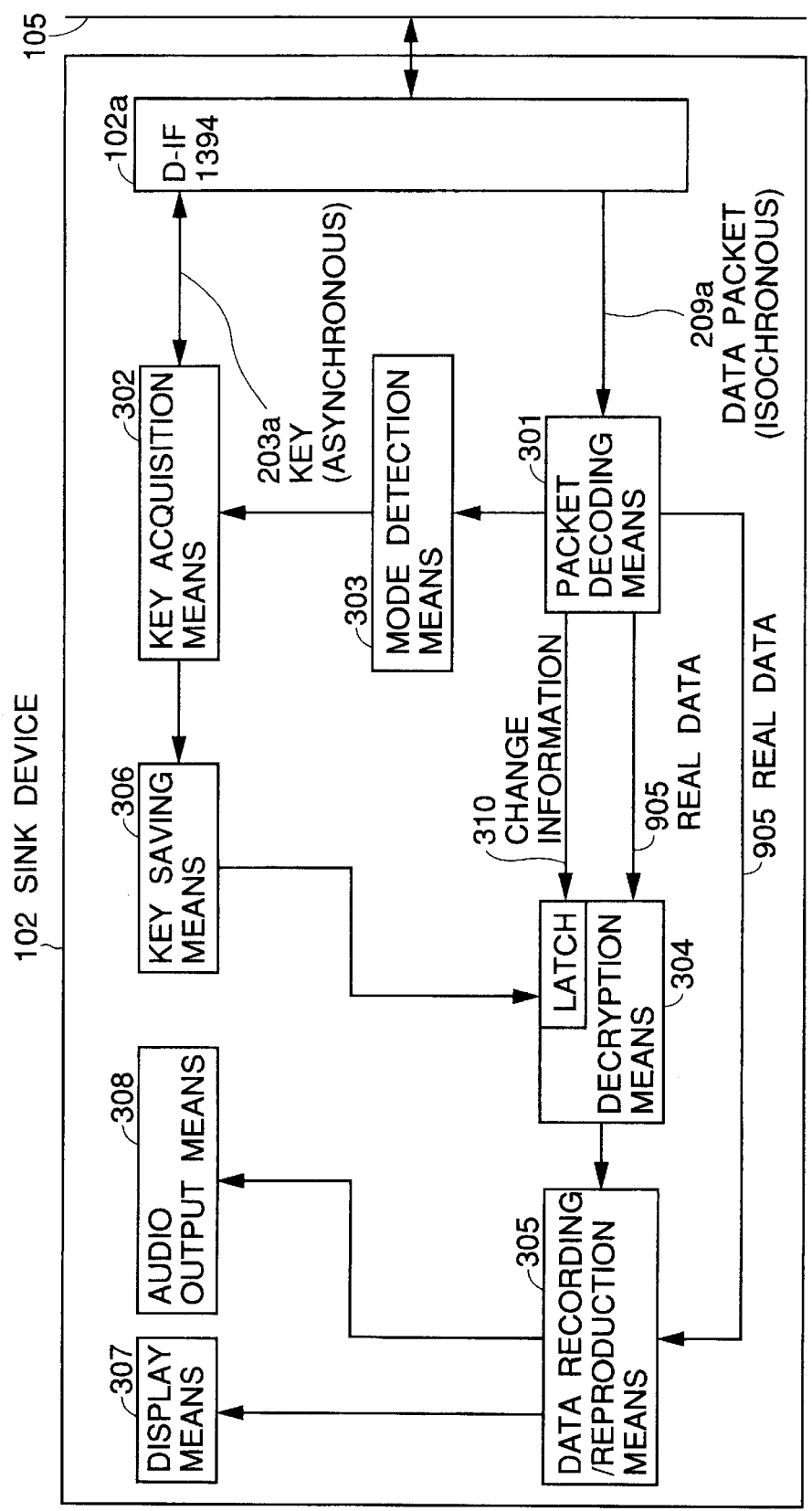
FIG. 3 is a block diagram showing an arrangement of a sink device according to the embodiment.

FIG. 1 is a schematic view showing the entire data transmission system of this embodiment, while FIGS. 2 and 3 block diagrams of a source device and a sink device constituting the data transmission system, respectively.

An arrangement of the embodiment is described with reference to these figures.

As shown in FIG. 1, in the data transmission system of the embodiment, a source device 101 is connected to a plurality of sink devices 102–104 through an IEEE 1394 bus 105. Each device 101–104 is connected to the IEEE 1394 bus 105 through D-IF 1394 input/output means (101a–104a).

In addition, data transfer between the source device 101 and the plurality of sink devices 102–104 is similar to that described for the conventional data transmission system. That is, it has an arrangement allowing the isochronous communication suitable for transfer of isochronous data such as video or audio signals to simultaneously exist on the IEEE 1394 bus 105 together with the asynchronous communication suitable for transfer of asynchronous data such as control signals.

Now, there is described an internal configuration of the source device 101 of the embodiment with reference to FIG. 2.

As shown in FIG. 2, data output means 201 is means for outputting video data or the like with a predetermined length to be transmitted on the 1394 bus 105 to mode determination means 202 and encryption means 205. The mode determination means 202 is means for determining in which group a key is used as the encryption key depending on the content of copy management information for the data such as video data to be transmitted, and outputting the determined content as encryption mode information to key generation means 203. Correlation between the copy management information and the encryption mode is further described later. In the embodiment, the copy management information is assumed to be information indicating three copyright protection levels of copy-freely, copy-one-generation, and copy-prohibited. The copy management information of the embodiment corresponds to the data management information of the present invention. In addition, the key generation means 203 is means for generating a key 203a used for encryption in a key group (group A or B) determined according to the encryption mode information from the mode determination means 202. The generation of key is sequentially performed in a time scale according to change-over information 207a from change-over timing determination means 207, and all keys generated differ from each other.

Here, as described above, further description is given of the correlation between the copy management information and the encryption mode.

It is assumed that, in correspondence to the three types of copy management information, the embodiment does not, perform encryption of copy-freely, determines the encryption key from group A for copy-one-generation, and determines the encryption key from group B for copy-prohibited. In other words, the encryption information is information for identifying the group of encryption key. Here, groups A and B do not have any key in common.

In addition, key saving means 204 is means for temporarily saving a key 203a generated by the key generation means 203, and outputting a saved key 203a to encryption means 205. The encryption means 205 is means for encrypting video data 201a output from the data output means 201 using the key 203a sent from the key saving means 204, and for outputting encrypted data 205a to packet generation means 209. Key distribution means 206 is means for authenticating a requesting device and a synchronously distributing the key 203a based on the result of authentication in accordance with the request from the sink device, and for sending completion of distribution of the key 203a to the change-over timing determination means 207. The change-over timing determination means 207 is means for determining the key change-over timing for temporally updating keys in the key group determined by the mode determination means 202, and sending change-over information 207a indicating the change-over timing to the key generation means 203 and change information generation means 208. The change information generation means 208 is means for obtaining information from the key distribution means 206 and the change-over timing determination means 207 to produce in-transition mode information, and for selectively outputting the copy management information (corresponding to the encryption mode) sent from the mode determination means 202 and the in-transition mode information to a packet generation means 209.

Here, the in-transition mode information is information for previously notifying the timing for changing over the keys in the same encryption mode.

Figure 6:
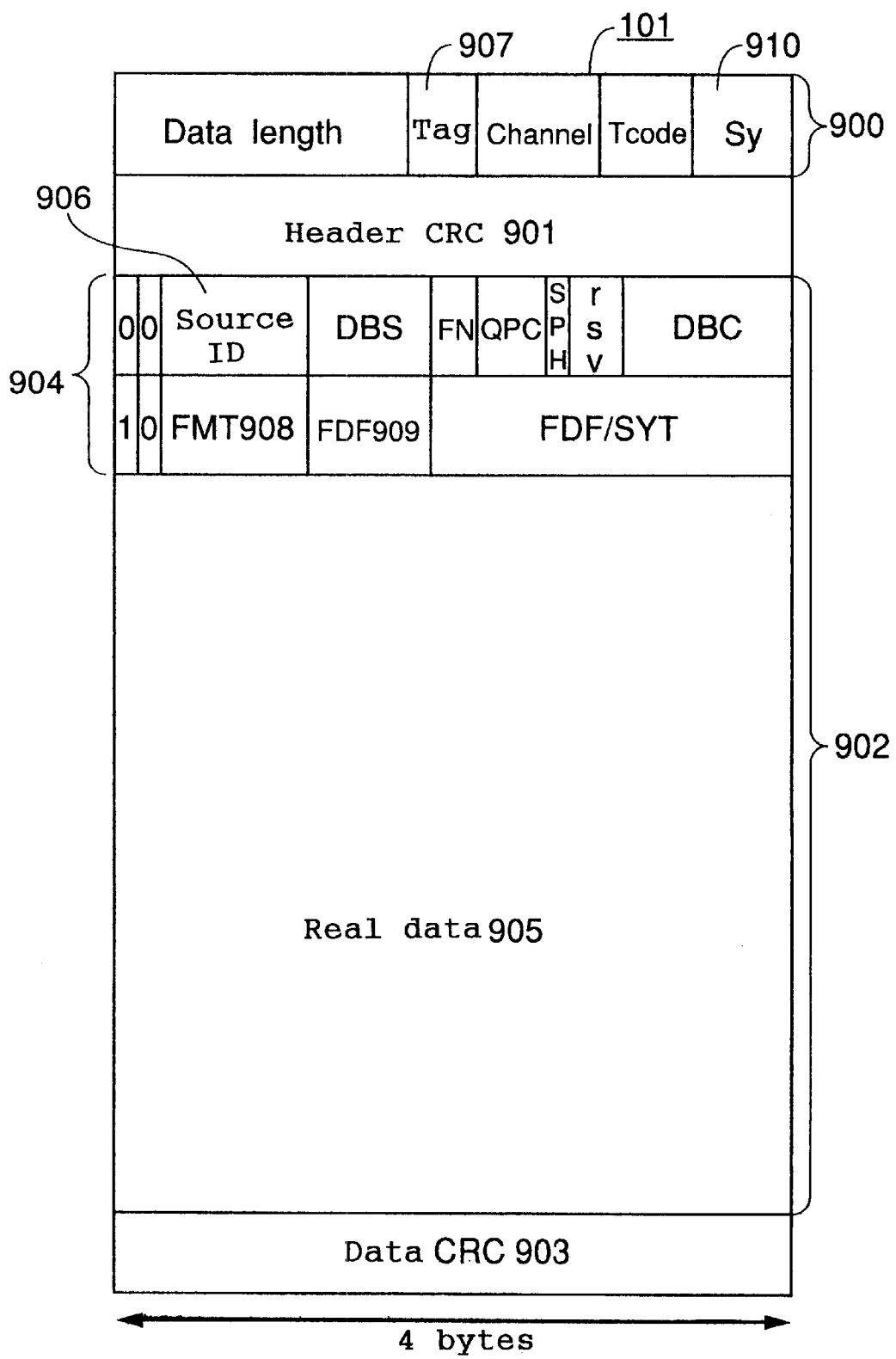
FIG. 6 is a format of an isochronous packet in a conventional data transfer method.

In addition, in the embodiment, both the encryption mode information and the in-transition mode information are contained in the Sy field 910 in the isochronous packet header 900 described for FIG. 6, and data 208a consisting of two bits.

Moreover, correspondence between the pattern of the two-bit data 208a, the copy management information (corresponding to the encryption information) and the in-transition mode information is as follows.

00 is assigned if the copy management information is copy-freely, 10 for copy-one-generation, 11 for copy-prohibited, 01 for the in-transition mode.

The packet generation means 209 is means for obtaining the encrypted data 205a (corresponding to the real data 905 of FIG. 6) and the two-bit data 208a contained in the Sy field to generate a data packet 209a transmitted onto the data bus 105 in the isochronous communication, and for outputting it to the D-IF 1394 input/output means 101a. Here, in the embodiment, the data packet has a configuration essentially same as that described for FIG. 6.

Moreover, the D-IF 1394 input/output means 101a inputs and outputs an isochronous packet and an asynchronous packet between the 1394 bus 105 and the source device 101. That is, it is means for outputting the data packet 209a (isochronous packet) output by the packet generation means 209 and the key information 203a (asynchronous packet) output by the key distribution means 206 onto the 1394 bus 105, and for outputting the asynchronous packet received from the 1394 bus 105 to the key distribution means 206.

Now, there is described an internal configuration of the sink device 102 of the embodiment with reference to FIG. 3.

As shown in FIG. 3, the D-IF 1394 input/output means 102a inputs and outputs an isochronous packet and an asynchronous packet between the 1394 bus 105 and the sink device 102. That is, the D-IF 1394 input/output means 102a is means for outputting a data packet 209a of an isochronous packet received from the 1394 bus 105 toward packet decoding means 301, and for outputting key information 203a of an asynchronous packet received from the 1394 bus 105 toward key acquisition means 302. In addition, the D-IF 1394 input/output means 102a is means for outputting a key information transfer request, which is an asynchronous packet, output by the key acquisition means 302 toward the 1394 bus 105.

The packet decoding means 301 is means for obtaining a data packet 209a from the D-IF 1394 input/output means 102a to extract two-bit data from the Sy field 910 (see FIG. 6) in a packet, for decoding the content of the two-bit data, for sending the extracted two-bit data to mode detection means 303, and, if it indicates the in-transition mode (change information), for also sending the extracted two-bit data to decryption means 304. In addition, the packet decoding means 301 is means for sending real data 905 (see FIG. 6) in the packet depending on the result of decryption of content of the two-bit data to the decryption means 304 or data recording/reproduction means 305.

The mode detection means 303 is means for investigating the content of copy management information sent from the packet decoding means 301, and for sending information to the effect that it is necessary to obtain a key for decrypting the real data 905 depending on the result of investigation to the key acquisition means 302.

The key acquisition means 302 is means for sending a request for transfer of key information for starting acquisition of a key to the D-IF 1394 input/output means 102a when the above information is sent from the mode detection means 303.

It is important here that the transfer request is appended with the copy management information sent from the mode detection means 303. The copy management information may be appended as is, or after it is converted into some value. When it is appended after a predetermined conversion, the source device 101 knows the rule of conversion, and can detect the copy management information before the conversion. Contemplated examples of predetermined conversion include, for example, an arrangement to convert two-bit 01 into four-bit 0100, 10 into 0010, and to send such four bits.

In addition, the key acquisition means 302 is means for sending the key information 203a transferred from the source device 101 to key saving means 306. In this regard, data management information retrieving means of the present invention includes the packet decoding means 301 and the mode detection means 303.

The key saving means 306 is means for temporarily saving the key information sent from the key acquisition means 302, and outputting the key information to the decryption means 304 at a predetermined timing.

The decryption means 304 is means for decrypting the real data 905 utilizing the key information from the key saving means 306 and the change information 310 of a key from the packet decoding means 301.

The data recording/reproduction means 305 is means for sending and displaying AV data decrypted by the decryption means 304 or AV data directly sent from the packet decoding means 301 to and on display means 307, and recording it in a built-in recording medium. In addition, audio output means 308 is means for outputting audio data from the data recording/reproduction means 305.

Other sink devices 103–104 have the same arrangement as above.

Figure 4:
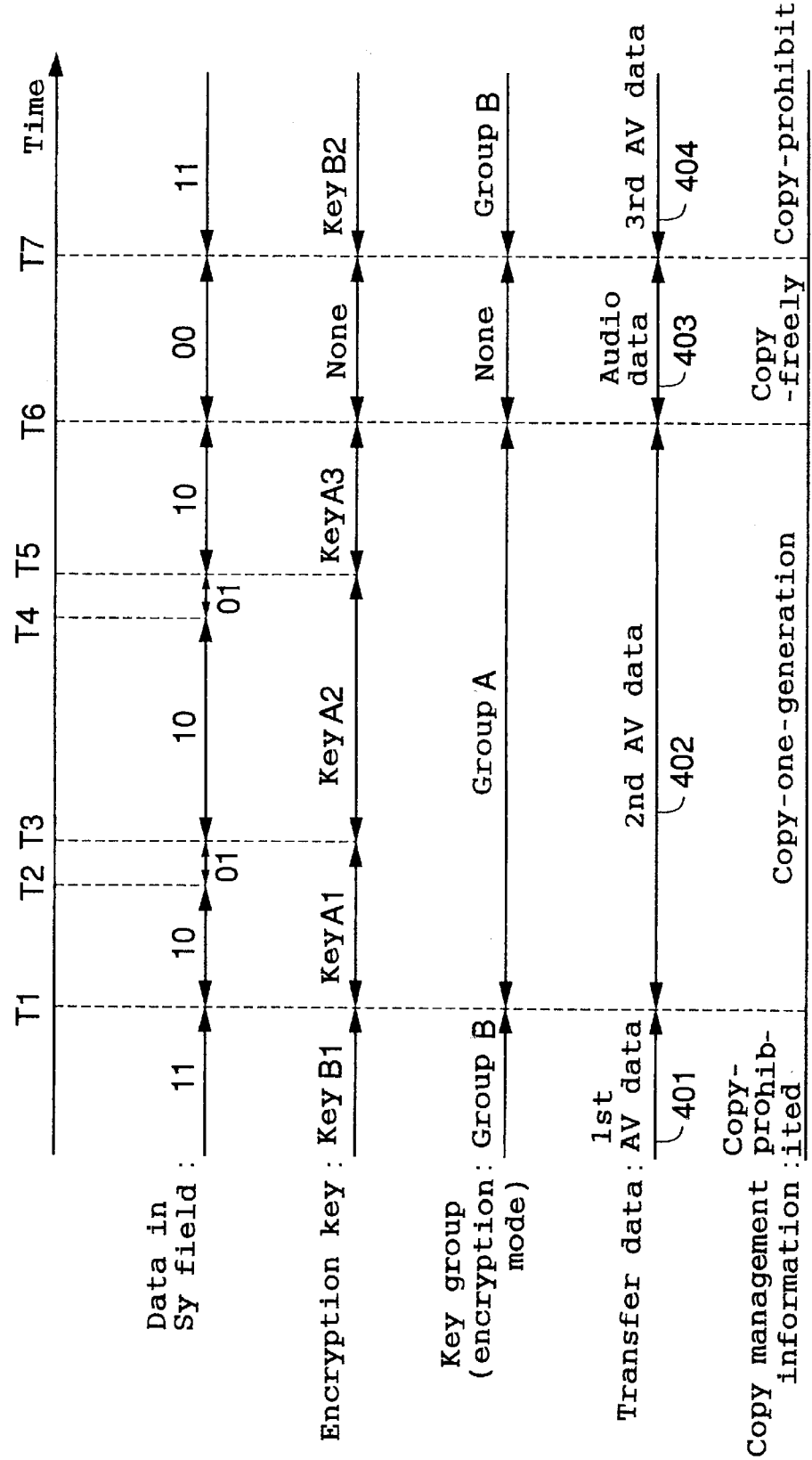
FIG. 4 is charts illustrating changes of encryption key by time in the embodiment.

In the above arrangement, there is described the operation of this embodiment referring to FIGS. 2–4, and also an embodiment of data transmission method and data receiving method of the present invention.

FIG. 4 is charts showing temporal changes of two-bit data and an encryption key contained in the Sy field 910 of the embodiment (see FIG. 6).

As shown in FIG. 4, in the embodiment, it is assumed that the source device 101 transfers first AV data 401 until time T1, second AV data 402 between time T1 and time T6, audio data 403 between time 6 and time 7, and then third AV data 404 onto the 1394 bus 105.

In addition, the copy management information of these transferred data is, as shown in the figure, sequentially copy-prohibited, copy-one-generation, copy-freely, and copy-prohibited from the top. Therefore, correspondence between each transferred data and the group of key being used is that the first AV data 401, the second AV data 402 and the third AV data 404 are transferred in correspondence to group B, group A, and group B, respectively in this order as shown in the figure. In addition, the audio data 403 is copy-freely, and is not encrypted, so that there is no corresponding group. Furthermore, it is assumed that the encryption key is updated three times in group A (keys A1-A3) during transfer of the second AV data 402.

(1) First, there is described an operation immediately after time T1.

The mode determination means 202 (see FIG. 2) detects the copy management information of the second AV data being output from the data output means 201, determines that it is copy-one-generation, determines that the corresponding group of encryption key is group A, and informs it to the key generation means 203. The key generation means 203 produces an encryption key A1 in group A, and sends it to the key saving means 204. The encryption means 205 encrypts the second AV data 402 using the encryption key A1 sent from the key saving means 204. The packet generation means 209 turns the second encrypted AV data 402 into the real data 905, stores "10" of the copy management information sent through the change information generation means 208 in the Sy field 910, and outputs it as a data packet to the D-IF 1394 input/output means 101a.

On the other hand, the sink device 102 (see FIG. 3) receives the data packet containing the second AV data 402 transferred onto the 1394 bus 105 through the D-IF 1394 input/output means 102a.

More specifically, the packet decoding means 301 extracts the two-bit data "10," which is the copy management information, stored in the Sy field 910 from the received data packet, and determines from its content that the real data 905 is encrypted. Then, it sends the two-bit data "10" as information to the effect that a key for decrypting the real data 905 should be acquired to the key acquisition means 302. The key acquisition means 302 sends a request for transfer of key information for starting acquisition of an encryption key by appending the two-bit data "10" and an identification number of the source device to the D-IF 1394 input/output means 102a. Here, the identification number of the source device is stored in the source ID 906 (see FIG. 6).

With this regard, as described above, there are two ways to append the copy management information to the transfer request. This is true for the case described in the following.

The source device 101 (see FIG. 2) receives the request of transfer of the key information from the sink device 102. The key distribution means 206 performs a predetermined authentication procedure with the source of the transfer request, and then sends the two-bit data "10" (copy management information) appended to the transfer request to the key generation means 203. The authentication procedure is a procedure for determining whether or not the destination is correct equipment. The key generation means 203 investigates the encryption mode corresponding to "10" (that is, the key group), and which is the corresponding key in the group, and, after it is determined to be key A1 in key group A by investigating which is the key corresponding in the group, generates the key or acquires the same key Al: already generated and saved, and transfers it to the source of the transfer request. The reason why the key distribution means 206 does not transfer encryption key A1 saved in the key saving means 204 as is, but is purposely arranged to investigate a corresponding key group and an encryption key in the group using the two-bit data "10" (copy management information) appended to the transfer request is to prevent the unauthorized action described in the Description of the Related Art. This will be further described later.

On the other hand, in the sink device 102 (see FIG. 3), the key acquisition means 302 acquires encryption key A1 sent from the source device 101, and sends it to the key saving means 306. The decryption means 304 decrypts the encrypted data sent from the packet decoding means 301 using encryption key A1 acquired from the key saving means 306, and sends it to the data recording/reproduction means 305.

The data recording/reproduction means 305 determines that the data "10" contained in the Sy field 910 is copy-one-generation, records the second decrypted AV data in the built-in recording medium, and also outputs it to the display means 307 and the audio output means 308 simultaneously.

Here, when the data recording/reproduction means 305 records the second AV data, it performs the recording operation after rewriting the data "10" which is the copy management information stored in the Sy field 910 to "11." This is because the recording performs copy once, and subsequent copy from the recording medium should be prohibited. However, the copy management information contained in the real data 905 is not rewritten.

It is of course possible here to arrange that encryption is not performed for a while from the start of transmission of the second AV data to avoid a problem that the second AV data cannot be decrypted until the sink device 102 obtains a new key, as described above, since, at time T1 when the second AV data is started to be transferred, the encryption key is changed from the one used just before it. Here, "for a while" is an interval until the sink device 102 completes acquisition of a new key.

(2) Then, there is described operation in time T2-T3.

During this interval, the Sy field 910 contains the change information "01" indicating the in-transition mode. When the packet decoding means 301 of the sink device 102 detects that the Sy field 910 contains the two-bit data "01", it sends "01" to the decryption means 304 to previously notify the fact that the key is being updated, and the decryption means 304 starts preparation of a new decryption process. In addition, the mode detection means 303 detects the fact that the two-bit data "01" is the change information, and notifies the key acquisition means 302 of necessity to acquire a new key. Here also, the copy management information becomes necessary in requesting transfer of a new key to be changed in a predetermined period of time. However, in this case, since the Sy field 910 does not contain the copy management information, it uses "10" which is the copy management information being sent just before the in-transition mode information is sent. Therefore, the key acquisition means 302 issues the key transfer request appended with "10", the just previous copy management information, to the source device 101.

In this case, since the key group is not changed, it may be arranged not to send the copy management information "10".

On the other hand, in the source device 101, the key distribution means 206 receives the transfer request for a new key, requests the key generation means 203 to generate new key A2 to be used from time T3 which is determined by the change-over timing determination means 207, and transfers the new generated key A2 to the sink device 102. At time T1, the source device 101 which receives the transfer request for key information from the sink device 102 has performed the predetermined authentication procedure with the source of the transfer request for key before the key is transferred to the source. Since the authentication procedure has been completed as above, it is not necessary to perform again the authentication procedure before the transfer of key at this time (that is, in the interval from time T2 to time T3). The generated key A2 is sent to the key saving means 204. In addition, the key distribution means 206 confirms through a predetermined transaction that distribution of the key to the sink device 102 is completed, and sends distribution completion information 206a to the change-over timing determination means 207. The change-over timing determination means 207 acquires the distribution completion information, and then instructs the encryption means 205 to change the key used up to then to new key A2 obtained from the key saving means 204 for encryption. This causes from time T3 the second AV data 402 encrypted by encryption key A2 to be transferred as a data packet onto the 1394 bus 105.

Since the sink device 102 has already acquired new key A2, it can perform decryption without trouble even if the second AV data 402 encrypted by encryption key A2 is received as a data packet. The subsequent operation is similar to case (1) described above.

(3) Then, there is described operation in time T4-T5.

This case is same as that of (2) above, except for that the new key is key A3.

The reason why the encryption key is updated by time even in the same mode is to further assure safety of encryption. That is, if the same key is used for a longer period of time, chance is increased for decryption of encrypt by an illegal action. On the other hand, there is increased the accumulated amount of data encrypted by the same key, and damage becomes significant if the encrypt is illegally decrypted. Such situation is taken into account.

(4) Then, there is described operation at time T6. In this case, there exists no encryption key since copy-freely audio data 403 is started to be transferred at time T6. Therefore, the change information "01" as previous notification as described above is not issued immediately before time T6.

In the sink device 102, the packet decoding means 301 detects the fact that the two-bit data "00", is stored in the Sy field 910 of the received data packet, determines that the real data 905 is not encrypted, and directly sends the real data 905 to the data recording/reproduction means 305. In addition, no transfer request for key is made to the source device 101. The operation in the data recording/reproduction means 305 is same as the above description.

(5) Then, there is described operation at time T7.

In this case, since the data to be transferred is the third AV data 404, which is copy-prohibited, the detail of operation is same as in the case (1) described above. In this embodiment, to prevent unauthorized decryption of the encrypt, the encryption key is updated by time for the transferred data provided with the same copy management information whether respective data is separated and independent, or temporally discontinuous. In this case, the key is also changed from key B1 used for encrypting the first AV data 401 to key B2. However, both keys B1 and B2 belong to the same group B.

Now, it is described in detail by taking as an example a case where the third AV data is received why further unauthorized action can be prevented even if the copy management information is tampered.

It is assumed that an unauthorized action is taken on a some point on the 1394 bus 105, and "11" information in the Sy field is tampered to "10" for the third AV data 404 received by the sink device 102.

The key acquisition means 302 (see FIG. 3) requests transfer of the key together with the tampered "10" data, as described above. Upon receipt of the transfer request, the key distribution means 206 (see FIG. 2) sends the attached "10" to the key generation means 203. The key generation means 203 examines a key group corresponding to "10" and encryption keys in the group, determines that it is a key belonging to group A, generates a key belonging to group A, and sends it to the sink device 102. The decryption means 304 of the sink device 102 cannot properly decrypt the third AV data 404 if it uses the key belonging to group A for decryption. It is because a correct key is key B2 belonging to group B. Therefore, the data recording/reproduction means 305 records data in a state where it is not properly decrypted and has no meaning, but is as per the content of the copy management information "10" on the recording medium only once. However, such recorded data has no value in use, and the unauthorized action is wasteful. Also, in this case, display on the display means 307 causes a meaningless image. Of course, it is also possible to arrange the data recording/reproduction means 305 that it does not perform a recording operation for data not properly decrypted.

While the present invention employs an encryption key as the type of encryption in the above embodiment, the type is not limited to such, and may be an algorithm of encryption. In such case, it is arranged to change the algorithm applied to transmission of data depending on the management information of data to be transmitted. Specifically, the methods for changing the algorithm may be roughly divided into the following two methods, for example. One is to make the encryption algorithm different by substituting the order of encryption processes, while the other is to make the encryption algorithm different by changing the number of loops for encryption process. The former case utilizes, for example, a characteristic that encrypted data when a first encryption process is applied to predetermined data, and a second encryption process is applied to the result of processing differs from encrypted data when the first and second encryption processes are applied in the reverse order. It can be implemented without making the arrangement of hardware such as an encryption circuit complicated In this case, both encrypted data have the same level of encryption strength. The number of loops generally means the number of repetitions of operation where, for example, a first encryption process is applied to predetermined data, and the same encryption process is applied to the result of processing. The latter case makes encrypted data different by changing the number of loops. In this case, the strength of encryption is generally enhanced by increasing the number of loops. It is needless to say to employ a combination of the former and the latter in which the order of encryption processes is changed, and the number of loops for each encryption process is changed. Furthermore, in the above case, the encryption keys may be the same or different. When the arrangement changing the encryption algorithm is applied, decryption information which the source device should transmit to the sink device is, for example, the order of encryption processes in the former case, and, for example, the number of loops in the latter case.

The above embodiment has been described for a case where the data recording/reproduction means rewrites the copy management information contained in the Sy field in recording copy-one-generation data. Here, this is further described. As also described for the above embodiment, the data recording/reproduction means does not rewrite up to the copy management information contained in the real data. Thus, when the recorded data is subsequently transmitted to another recording device or the like, since the information in the Sy field does not match information in the real data, confusion may arise at that another recording device. Then, although both information should be primarily matched, it may be possible that the unmatched state is positively allowed to avoid that the arrangement of device becomes complicated, and, instead, there is provided an arrangement to write information indicating the fact in the Sy field. That is, there is provided new information called a "stream copy" which is information indicating that, when copy-one-generation data is received and recorded, and then transmitted, the copy management information in the real data is not rewritten, but the real data is copy prohibited; and two-bit data stored in the Sy field is made "01". In this case, in recording AV data, the data recording/reproduction means 305 performs the recording operation by rewriting the data of "10", the copy management information stored in the Sy field 910, to "01" meaning no-more-copies. This allows a normal device to distinguish the data as the copy management information indicating that data is originally copy-prohibited from the data indicating that subsequent copy is prohibited as copy is once performed. Therefore, it becomes possible to perform proper operation without confusion with the information in the Sy field. Furthermore, in this case, it is possible to provide a new type of encryption corresponding to the "stream copy" as the copy management information (for example, group C of encryption key) with a similar arrangement to that described for the above embodiment. That is, as described above, it is because, if there is a device which, after receiving and recording copy-one-generation data, further transmits the recorded data (second generation data), the effect similar to the above can be exhibited for the copy management information of the second generation data.

Also in this case, since the in-transition information described for the above embodiment cannot be represented by the Sy field, it may be arranged to, for example, assure an independent one-bit region other than the Sy field 910 in the isochronous packet header 900, and to store the in-transition information in that region.

Furthermore, while the above embodiment has been described for a case where the in-transition information "01" is stored in the Sy field 910, the present invention is not limited to such arrangement, but may be arranged to assure an independent one-bit region other than the Sy field 910 in the isochronous packet header 900, and to store the in-transition information in that region.

In addition, the above embodiment has been described for a case where the sink device issues a new transfer request for key after receiving information on previous notification on a key being changed by time. However, the present invention is not limited to such arrangement, but may be arranged, for example, such that the source device transmits update information rather than the previous notification information, and, when there is a transfer request for key from the sink device receiving the update information, the source device sends a key to be used next in addition to the key requested for transfer. Here, the update information is information that, when the types of key (that is, types of encryption) are updated by time as described above, informs the sink device of execution of that update, and is generated by the change information generation means 208 (see FIG. 2). With this regard, the update execution information generation means of the present invention corresponds to the change information generation means 208.

Figure 5:
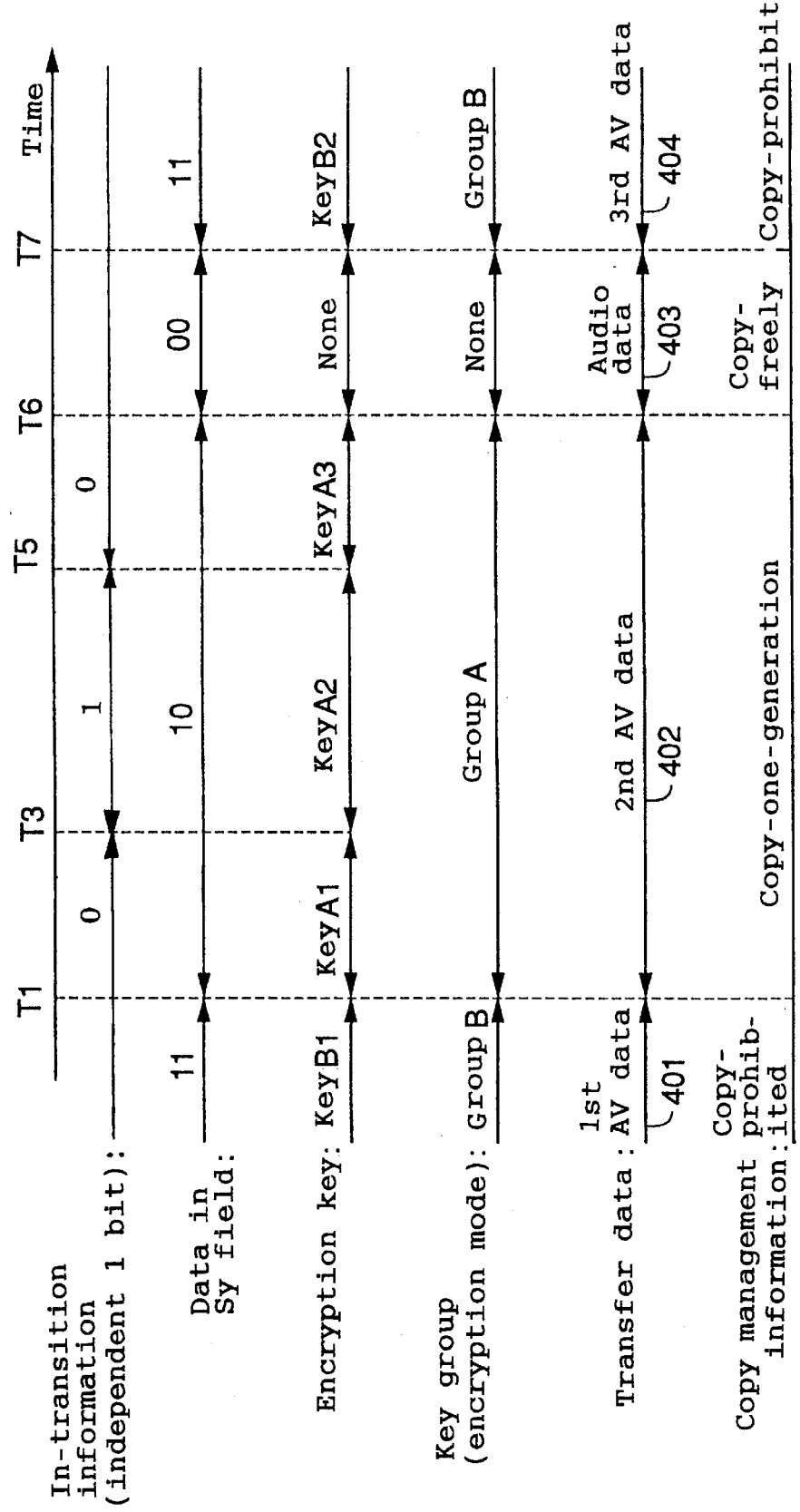
FIG. 5 is charts illustrating changes of encryption key by time in another embodiment of the present invention.

In this case, as shown in FIG. 5, the in-transition information assured in independent one bit corresponds to the update information, and informs the sink device of the timing to use a new key.

That is, in FIG. 5, the sink device has simultaneously acquired keys A1 and A2 immediately after time T1. When the in-transition information is inverted from 0 to 1 at time T3, the sink device detects the timing of this inversion, and starts to use the new key (key A2). In addition, at the moment, the sink device requests transfer of key for the source device as described above. For this transfer request, the source device simultaneously sends key A2 being currently used and key A3 to be used next. Therefore, key A2 would overlap one already sent. Then, the sink device holds key A3 as is, but, for key A2, uses the key already acquired as is, and discards key A2 sent the second time. Differing from the above, it is of course possible to substitute the key already acquired for key A2 sent the second time, and use it.

In addition, in FIG. 5, since the in-transition information is inverted from 1 to 0 at time T5, after this inversion is detected, the operation becomes the same operation as above. Of course, the above arrangement can be applied not only to the encryption key, but also, for example, similarly to a case where the encryption algorithm is changed.

In addition, while the above embodiment transmits the key as the decryption information as is for simplicity of description, the decryption information is not limited to such, but may be any information as long as it is information from which the sink device can generate a key. For example, a key may be encrypted and sent to a sink device, while the sink device decrypts the encrypted key to obtain the key itself. The information necessary for decryption may be shared between the source device and the sink device during the authentication procedure, or may be previously stored in the source device and the sink device when they are manufactured. With such arrangement, even if transmission of a key is tapped by a third party, the third party cannot obtain the key.

In addition, while the above embodiment has been described for a case where the encryption key is changed by time also for the data with the same copy management information, the present invention is not limited to such arrangement, but may be arranged not to change the key by time for an arrangement in which the key or encryption algorithm is varied depending on the copy management information.

Moreover, while the above embodiment has been described for a case where copy-freely, copy-one-generation, copy-prohibited and the like are used as the copy management information, the present invention is not limited to such arrangement, but it may be of course difference in the number of copies, and not limited to them.

Furthermore, it may be possible to produce a recording medium such as a magnetic recording medium or an optical recording medium which records a program for causing a computer to execute all or parts of functions of each means described in the embodiments described above or one of their modifications, and to perform operations similar to those described above by utilizing such recording medium.

Furthermore, the processing operation of each means in the embodiments described above and their modifications may be implemented in a form of software through operations of a program using a computer, or may be implemented in a form of hardware through a specific circuit configuration without using a computer.

As clearly seen from the above, the present invention has an advantage that transmission data can be more surely protected than in the prior art.

What is claimed is:

1. A data transmission method comprising the steps of:
   providing a plurality of types of encryption for each type of data management information;
   selecting one of the plurality of types of encryption applied to transmission of data depending on a type of data management information for said data to be transmitted;
   encrypting said data based on said selected type of encryption; and transmitting said encrypted data and said data management information.

2. A data receiving method comprising the steps of:
   receiving transmission data transmitted from the data transmission method as set forth in claim 1;
   retrieving said data management information from said received data; and
   sending said retrieved data management information to the source of said transmitted data and requesting decryption information corresponding to said transmitted data management information.

3. The data transmission method as set forth in claim 2, further comprising the step of, transmitting said decryption information corresponding to said data management information to said requesting device.

4. The data receiving method as set forth in claim 3, further comprising the steps of:
   decrypting said received data based on said decryption information and
   determining how to process said decrypted received data according to said retrieved data management information.

5. The data receiving method as set forth in claim 2, wherein sending said data management information is to send said retrieved data management information as is, or to send said retrieved data management information after predetermined conversion.

6. A program recording medium recording a program for causing a computer to execute all or parts of steps as set forth in claim 2.

7. The data transmission method as set forth in claim 1, wherein determining the type of encryption applied to transmission of said data according to said data management information is to make a key used for encryption different depending on said data management information.

8. The data transmission method as set forth in claim 1, wherein determining the type of encryption applied to transmission of said data according to said data management information is to make an algorithm used for encryption different depending on said data management information.

9. The data transmission method as set forth in claim 1, wherein said data management information is copy management information which includes information indicating that said data is copy-freely, copy-one-generation, or copy-prohibited.

10. The data transmission method as set forth in claim 9, wherein
    said information indicating copy-prohibited includes two types of information, one indicating that the data is originally copy-prohibited, the other indicating no-more-copies meaning that the data is prohibited for subsequent copy as it is originally copy-one-generation and the one generation is performed, and
    said type of encryption differs depending on these two types of information.

11. The data receiving method as set forth in claim 10, further comprising the step of:
    in recording data with said information indicating copy-one-generation as the data management information in a predetermined recording medium, changing the content of said data management information from said copy-one-generation to said no-more-copies, and performing said recording together with the data management information indicating said no-more-copies.

12. The data receiving method as set forth in claim 9, further comprising the step of:
    in recording data with said information indicating copy-one-generation as the data management information in a predetermined recording medium, changing the content of said data management information from said copy-one-generation to copy-prohibited, and performing said recording together with the data management information indicating said copy-prohibited.

13. A program recording medium recording a program for causing a computer to execute all or parts of steps as set forth in claim 1.

14. The data transmission method of claim 1 in which encrypting is performed by a plurality of keys, and
    a key for encrypting one type of encryption for one type of data management information is not common with any other key for encrypting any other type of encryption provided for another type of data management information.

15. The data transmission method of claim 1 in which encrypting is performed by one of a plurality of keys and a plurality of algorithms, and
    one of a key and an algorithm for encrypting one type of encryption for one type of data management information is not similar to any other respective key and algorithm for encrypting any other type of encryption provided for another type of data management information.

16. A data transmission method comprising the steps of:
    determining a type of encryption applied to transmission of data depending on management information for said data to be transmitted;
    encrypting said data based on said determined type of encryption;
    transmitting said encrypted data and said management information;
    updating said type of encryption by time even if said data management information is identical;

encrypting said data to be transmitted with said updated type of encryption; and transmitting previous notification information previously notifying that said update is performed before transmitting said encrypted data.

17. The data transmission method as set forth in claim 16, wherein, when said type of encryption is updated by time, said updated type of encryption does not overlap said another type of encryption determined according to said data management information.

18. The data transmission method as set forth in claim 16, further comprising the steps of:

receiving, by a sink of the transmitted information, said previous notification information;

sending by the sink said data management information to a source of said transmitted data according to the previous notification information, and requesting by the sink said decryption information.

19. A data transmission method comprising the steps of;

determining a type of encryption applied to transmission of data depending on management information for said data to be transmitted;

encrypting said data based on said determined type of encryption;

transmitting said encrypted data and said data management information;

updating said type of encryption by time even if said data management information is identical;

transmitting information indicating that said update has been performed; and when decryption information corresponding to said data management information is requested, transmitting both decryption information to be used at the moment and decryption information to be used the next time.

20. The data transmission method as set forth in claim 19, further comprising the steps of:

receiving by a sink of the transmitted information that said update has been performed; and requesting by the sink said decryption information based on the received information.

21. The data transmission method as set forth in claim 20, fixer comprising the steps of:

in recording data with said management information in which the information indicates copy-one-generation in a predetermined recording medium, changing the content of said data management information from copy-one-generation to copy-prohibited and performing said recording together with the data management information indicating said copy-prohibited.

22. The data receiving method as set forth in claim 21, further comprising the steps of:

in recording data wit said management information indicating copy-one-generation, changing the content of said data management information from said copy-one-generation to no-more-copies, and performing said recording together with the data management information indicating said no-more-copies.

23. The data receiving method as set forth in claim 19, further comprising the step of, indicating that said update has been performed is received, requesting said decryption information for the source of said information based on the received information.

24. The data transmission method as set forth in claim 19, wherein, when said type of encryption is updated by time, said updated type of encryption does not overlap said another type of encryption determined according to said data management information.

25. A data transmission system comprising:

mode determination means of determining a type of encryption applied to transmission of data depending on management information for said data to be transmitted;

encryption means of encrypting said data based on said determined type of encryption;

data transmission means of transmitting said encrypted data and said data management information;

data receiving means of receiving the transmission data transmitted by said data transmission means;

data management information retrieving means of retrieving said data management information from said received data;

decryption information requesting means of sending said retrieved data management information to a source of said transmitted data and requesting decryption information corresponding to said transmitted data management information;

decryption information transmitting means of transmitting said decryption information corresponding to said data management information to said requesting device when said decryption information is requested;

decryption means of decrypting said received data based on said decryption information being sent;

processing method determination means of determining how to process said decrypted received data according to said retrieved data management information;

encryption type updating means of updating said type of encryption by time even if said data management information is identical; and previous notification information generation means of generating previous notification information for previously noting that said update is performed, wherein when said encryption means encrypts data to be transmitted, said encryption means encrypts it according to said updated type of encryption, and said generated previous notification information is transmitted before said data encrypted according to said updated type of encryption is transmitted.

26. The data transmission system as set forth in claim 25, wherein said decryption information requesting means requests said decryption information to said source of said transmitted data in response to said received previous notification information.

27. The data transmission system as set forth in claim 25, wherein, when said type of encryption is updated by time, said updated type of encryption does not overlap said another type of encryption determined according to said data management information.

28. A data transmission system comprising:

mode determination means of determining a type of encryption applied to transmission of data depending on management information for said data to be transmitted;

encryption means of encrypting said data based on said determined type of encryption;

data transmission means of transmitting said encrypted data and said data management information;

data receiving means of receiving the transmission data transmitted by said data transmission means;

data management information retrieving means of retrieving said data management information from said received data;

decryption information requesting means of sending said retrieved data management information to a source of said transmitted data and requesting decryption information corresponding to said transmitted data management information;

decryption information transmitting means of transmitting said decryption information corresponding to said data management information to said requesting device when said decryption information is requested;

decryption means of decrypting said received data based on said decryption information being sent;

processing method determination means of deter g how to process said decrypted received data according to said retrieved data management information;

encryption type updating means of updating said type of encrypting by time even if said data management information is identical; and update execution information generation means of generating update information for notifying that said update has been performed, wherein when said encryption meant encrypts data to be transmitted, said encryption means encrypts it according to said updated type of encryption, and said update information is transmitted when the data encrypted according to said updated type of encryption is started to be remitted.

29. The data transmission system as set forth in claim 28, wherein said decryption information requesting means requests said decryption information for said source of said transmitted data in response to change of said received update information.

30. The data transmission system as set forth in claim 28, wherein, when said type of encryption is updated by time, said updated type of encryption does not overlap said another type of encryption determined according to said data management information.

31. A data transmission system comprising:

mode determination means of determining a type of encryption applied to transmission of data depending on management information for said data to be transmitted in which said type of encryption is one of a plurality of types of encryption provided for each type of management information;

encryption means of encrypting said data based on said determined type of encryption;

data transmission means of transmitting said encrypted data and said management information;

data receiving means of receiving the transmission data transmitted by said data transmission means;

data management information retrieving means of retrieving said data management information from said received data;

decryption information requesting means of sending said retrieved data management information to the source of said transmitted data and requesting decryption information corresponding to said transmitted data management information;

decryption information transmitting means of transmitting said decryption information corresponding to said data management informing to said requesting device when said decryption information is requested;

decryption means of decrypting said received data based on said decryption information being sent; and processing method determination means of determining how to process said decrypted received data according to said retrieved data management information.

32. The data transmission system as set forth in claim 31, wherein sending said data management information is to send said retrieved data management information as is, or to send said retrieved data management information after predetermined conversion.

33. The data transmission system as set forth in claim 31, wherein determining the type of encryption applied to transmission of said data according to said data management information is to make a key used for encryption different depending on said data management information.

34. The data transmission system as set forth in claim 31, wherein determining the type of encryption applied to transmission of said data according to said data management information is to make an algorithm used for encryption different depending on said data management information.

35. The data transmission system as set forth in claim 31, wherein said data management information is copy management information which includes information indicating that said data is copy-freely, copy-one-generation, or copy-prohibited.

36. The data transmission system as set forth in claim 35, wherein said information indicating copy-prohibited includes two types of information, one indicating that the data is originally copy-prohibited, the other indicating no-more-copies meaning that the data is prohibited for subsequent copy as it is originally copy-one-generation and the one generation is performed, and said type of encryption depends on these two types of information.

37. The data transmission system as set forth in claim 36, further comprising the step of:

when the data management information sent by said data transmission means indicates copy-one-generation, in recording data with said information indicating copy-one-generation as the data management information in a predetermined recording medium, changing the content of said data management information from said copy-one-generation to no-more-copies, and performing said recording together with the data management information indicating no-more-copies.

38. The data transmission system as set forth in claim 35, further comprising the step of:

when the data management information sent by said data transmission means indicates copy-one-generation, in recording data with said information indicating copy-one-generation as the data management information in a predetermined recording medium, changing the content of said data management information from said copy-one-generation to copy-prohibited, and performing said recording together with the data management information indicating copy-prohibited.

39. A program recording medium recording a program for causing a computer to execute all or parts of functions of each means as set forth in claim 31.

40. The data transmission system of claim 31 in which said encrypting means includes a plurality of keys, and a key for encrypting one type of encryption for one type of management information is not common with any other key for encrypting any other type of encryption provided for another type of management information.

41. The data transmission system of claim 31 in which said encrypting means includes one of a plurality of keys and a plurality of algorithms, and one of a key and an algorithm for encrypting one type of enctypion for one type of management information is not similar to any other respective key and algorithm for encrypting any other type of encryption provided for another type of management information.

* * * * *